Jan. 26, 1932.  D. A. BREEGLE  1,842,894
VALVE
Filed Dec. 27, 1927

Inventor
Daniel A. Breegle
By Chas. J. Williamson
Attorney

Patented Jan. 26, 1932

1,842,894

UNITED STATES PATENT OFFICE

DANIEL A. BREEGLE, OF HUNKERS, PENNSYLVANIA

VALVE

Application filed December 27, 1927. Serial No. 242,803.

The object of my invention is to provide a valve or faucet which while capable of delivering cold and hot water, and intermediate temperature between cold and hot water will be of exceedingly simple and inexpensive construction so that its first cost will be low, its installation easy, and it will not get out of order and require repairs and which will be capable of concealed installation.

My invention consists in whatever is described by or is included within the terms or scope of the appended claims.

Figure 1:
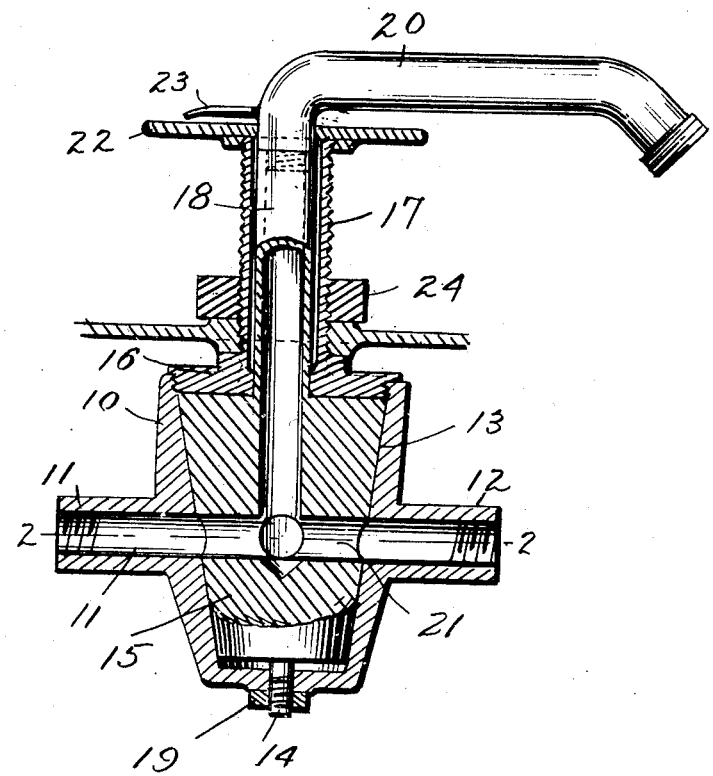
Fig. 1 is a vertical section through a valve embodying my invention.
Figure 2:
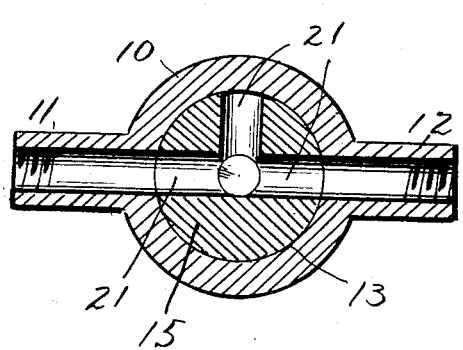
Fig. 2 is a horizontal section on the line 2—2 of Fig. 1.

Describing in detail what is shown in the drawings, the valve-body, 10, has opposite inlets, 11 and 12, for the screw connection respectively of the cold and hot water pipes, and a conical chamber, 13, extends from the top of the body downward, the bottom being closed except for a central opening for the passage of a stem, 14, on the lower end of the conical plug or valve, 15. The upper end of the chamber is the larger and it is closed by a cap, 16, which screws into the internally threaded top of the body, and extending upwardly from the cap is a tubular extension, 17. Within the tubular extension, the plug or valve has a tubular stem, 18, which loosely fits the interior of the extension so that there is nothing to prevent direct and close contact of the conical exterior of the valve with the conical interior of the chamber in the body, and thus the valve is self-seating or makes its own seat from use, and hence no packing is required but at all times the joints are so close that no water will leak. The valve plug is held to its seat by a nut, 19, screwed on the plug stem, 14, at the bottom where it projects outside of the body, the nut being a lock-nut.

To the top of the tubular stem, 18, is attached as by a screw connection, a tubular radial arm, 20, with its outer end down-turned which provides the valve outlet for the flow of water to the basin or fixture to which the valve is applied and by swinging said nozzle horizontally, ports, 21, in the plug are placed in and out of register with the two water inlets, so that at one time only cold water flows into and through the valve and at another time only hot water flows into and through the valve, and at another time water from both inlets flows into the valve and mixes, giving a mixture of a temperature depending on the temperatures of the hot and cold water. The nozzle, itself, may be used as a handle or a separate handle may be attached thereto. Screwed to the top of the cap concentric with the hollow stem, 18, is a circular dial, 22, with markings to indicate the temperature of water discharged from the valve, and the shut-off position of the valve, when an index or pointer, 23, attached to the stem or handle points thereto.

Preferably the outlet end of the nozzle is adapted for the interchangeable connection of sprays, showers, and the like.

The exterior of the cap extension is threaded throughout its length and applied thereto is a nut, 24, for securing the valve to a basin or other fixture, the latter having a hole through which the cap extension passes and said nut screwing against the fixture.

As the valve-ports are between the top and bottom of the valve, the valve-plug completely fills the chamber in the body except for the slight space at the bottom required for adjustment so that there are no chambers or spaces into which the results of corrosion or other sediment can collect and thus the valve is safeguarded from obstruction to its action from that source. Preferably all of the parts are of brass except when a porcelain handle is used.

The lack of contact of the plug stem with the interior of the cap extension, is important because thereby the conical valve plug may conform itself to the conical interior of the chamber and thus be self-seating.

I claim:

1. A valve comprising a body with a conical chamber and hot and cold water inlets leading into the chamber between the top and bottom thereof, a conical ported plug substantially filling such chamber, means securing the plug at the small end, a cap for the chamber at the large end of the plug in contact with the upper end of the plug, said cap having a tubular extension, and a tubular stem extending from the large end of the valve through such extension free to turn therein without contact with the interior thereof.

2. A valve comprising a body with a conical chamber and hot and cold water inlets leading into the chamber between the top and bottom thereof, a conical ported plug substantially filling such chamber, means securing the plug at the small end, a cap for the chamber at the large end of the plug having a tubular extension, and a tubular stem extending from the large end of the valve through such extension free to turn therein without contact with the interior thereof, a radially extending nozzle at the top of the stem, said cap extension being externally threaded, and clamping means engaging said thread.

3. A valve as in claim 2 having a dial disc secured to the upper end of the cap extension immediately below the radially extending nozzle.

In testimony whereof I hereunto affix my signature.

DANIEL A. BREEGLE.